Oct. 30, 1923.

B. THOMSON 1,472,199

CONSTRUCTION OF WINGS OF AEROPLANES, SEAPLANES, AND LIKE AERIAL MACHINES

Filed May 12, 1923    2 Sheets-Sheet 1

Inventor
B. Thomson
By Marks + Clerk
Attys.

Oct. 30, 1923. 1,472,199
B. THOMSON
CONSTRUCTION OF WINGS OF AEROPLANES, SEAPLANES, AND LIKE AERIAL MACHINES
Filed May 12, 1923 2 Sheets-Sheet 2

Inventor
B. Thomsom
By Marks & Clerk
Attys.

Patented Oct. 30, 1923.

1,472,199

UNITED STATES PATENT OFFICE.

BERNARD THOMSON, OF WOLDINGHAM, ENGLAND.

CONSTRUCTION OF WINGS OF AEROPLANES, SEAPLANES, AND LIKE AERIAL MACHINES.

Application filed May 12, 1923. Serial No. 638,630.

*To all whom it may concern:*

Be it known that I, BERNARD THOMSON, a British subject, and residing at Combe Close, Woldingham, in the county of Surrey, England, have invented certain new and useful Improvements in the Construction of Wings of Aeroplanes, Seaplanes, and like Aerial Machines, of which the following is a specification.

This invention relates to the construction of the wings of aeroplanes, seaplanes and like aerial machines of the kind provided with a through-slot near the leading edge of the wing and extending transversely to the direction of motion of the wing through the air.

Hitherto various arrangements have been adopted by which the upper end of the slot may be closed at will, but so far as I am aware no means exist whereby the slot may be completely closed, and as this is an important practical consideration, the object of the present invention is to provide simple and effective means for meeting this want.

The invention consists in a wing of the type referred to provided with means for closing both the upper and lower ends of the slot.

The invention also consists in a wing of the type referred to in which the supplementary wing (between which and the main wing the slot is formed) comprises two parts, one of which is adapted to close the upper end of the slot, while the other is adapted to close the lower end of the slot.

The invention also consists in a wing of the above character in which the operating mechanism of one part of the supplementary wing automatically effects the required movement of the other part of said supplementary wing.

The invention further comprises an improved construction of wing hereinafter described or indicated.

My invention will now be described with reference to the accompanying drawings, in which:—

Figure 1:
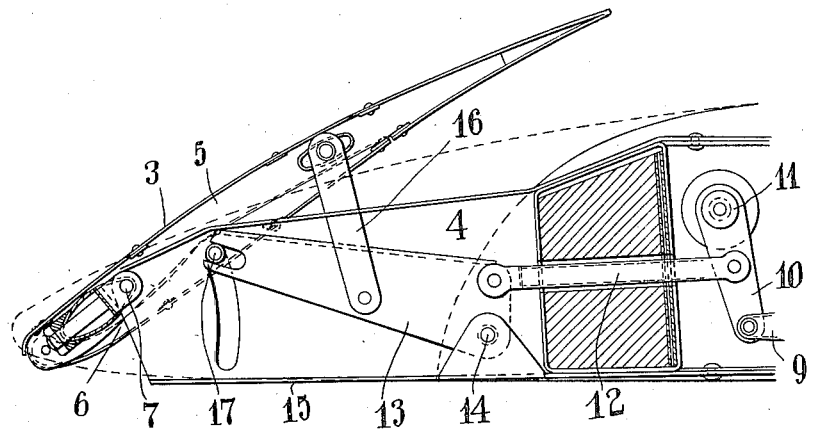
Figure 1 is a view of one form of the device showing the slot open at both ends.
Figure 2:
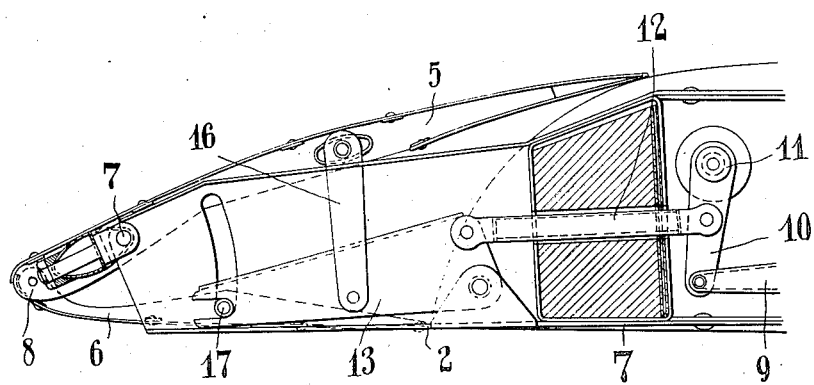
Figure 2 is a view similar to Figure 1, showing the slot completely closed.

In carrying my invention into effect in the manner shown in Figures 1 and 2, I provide in conjunction with the main wing 1 and in advance of the leading edge 2 thereof a supplementary wing 3, between which and the main wing 1 a through slot 4 is formed in a known manner, which extends transversely of the direction of motion of the wing through the air. The supplementary wing section 3 I form in two parts 5 and 6, the member 5 being mounted upon the spindle 7 and the member 6 upon a spindle 8, whereby they are each adapted for pivotal movement, the arrangement being such that rotation of the part 5 will close the upper end of the slot 4, while rotation of the other part 6 closes the lower end of the slot 4. The two sections of the supplementary wing are formed to lie snugly together against one another as shown in Figure 1, so that when in this position the whole section of the supplementary wing is of the usual wing formation in cross-section with its outer surfaces disposed in a manner best suited to the fulfilment of the functions for which it is required. The movements of the two members forming the supplementary wing may be controlled through a system of links and levers comprising a member 9 connected at its extremity to a lever 10 pivoted at 11 to a suitable part of the main wing structure. A link 12 co-operates with a plate 13 pivoted at 14 upon the extension or frame 15 of the main wing structure and is connected to the supplementary wing member 5 by means of a link 16 and to the supplementary wing member 6 by means of a pin 17 engaging a slot at the extremity of the plate 13, the arrangement being such that operating the link 9 the two supplementary members can be caused to take either of the positions shown.

Figure 3:
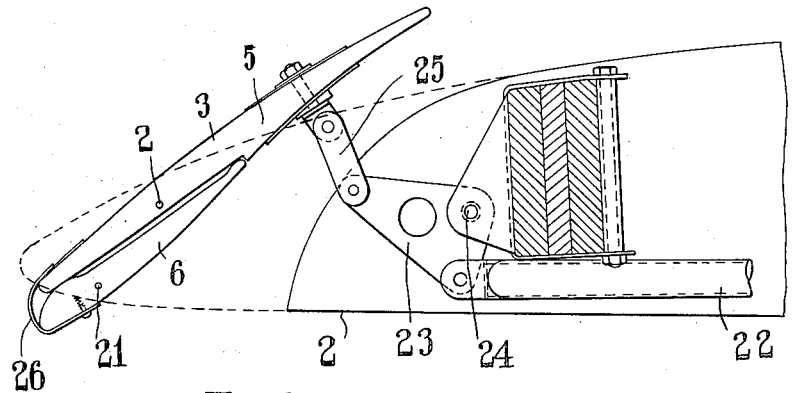
Figure 3 is a view of a modification showing the slot open.
Figure 4:
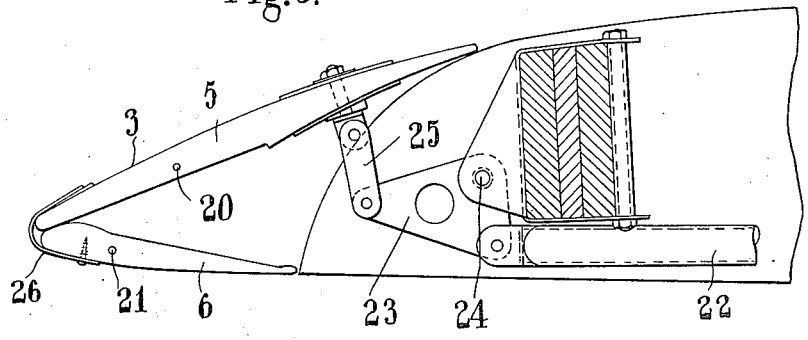
Figure 4 is a view similar to Figure 9, showing the slot closed at both ends.
Figure 5:
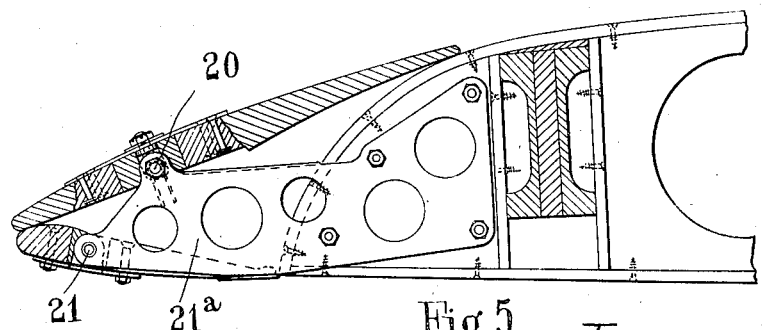
Figure 5 is a view of a device similar to that shown in Figures 3 and 4 showing the method of pivoting the members.

In the arrangement shown in Figures 3, 4 and 5 I pivot the two members 5 and 6 upon two fixed pivots 20 and 21 respectively, carried upon the rigid frame 21ª carried by the main wing structure, whereby the operation of the member 5 to open the slot 4 will cause the member 6 to move simultaneously to take up the position adjacent the member 5 as shown in Figure 3, a suitable system of transmission mechanism comprising the member 22 adapted to be suitably operated, whereby this may be effected, and said member being connected to the bell crank 23 pivoted at 24 to the frame structure of the main wing and functioning to operate the member 5 and through it the member 6 by means of a link 25. In this construction a spring steel U-channel 26 may be attached to the lower flap and sliding over the upper flap will thereby tend to keep the two members closed at their outer extremities.

It is to be understood that the invention is not to be confined to any particular formation or arrangement of linkwork or to other means or devices by which the two supplementary wing parts may be separately or simultaneously actuated, the actuating means if necessary or desirable being such that the slot may be wholly or partly closed by movement of the two supplementary wing sections.

Furthermore, I may mount my two supplementary members upon a tube forming a common pivot about which the parts rotate, or the two parts may be separately pivoted to an elliptical or other suitably shaped member which is also preferably arranged so that when the wing sections are closed together the whole forms a stream-line or smooth surface, so that no undesirable eddies are set up, these and other modifications coming within the scope of the invention and being employed as may be found necessary to meet any practical requirements which may have to be fulfilled.

Having now described my invention, what I claim as new and desire to secure by Letters Patent is:—

1. A wing structure for aeroplanes and the like comprising a main wing, a supplemental wing arranged in advance of the leading edge of the main wing, and spaced apart therefrom to form a transverse slot between said wings, said supplemental wing being formed in two parts, means supporting the supplemental wing parts for swinging movement about an axis located forwardly of the leading edge of the main wing, and means for moving each of said supplemental wing parts so that they may respectively close the upper and lower parts of said slot.

2. A wing structure for aeroplanes and the like comprising a main wing, a supplemental wing arranged in advance of the leading edge of the main wing and spaced apart therefrom to form a transverse slot between said wings, said supplemental wing being formed in two parts, means supporting the supplemental wing parts for swinging movement about an axis located forwardly of the leading edge of the main wing, and means for moving each of said supplemental wing parts so that they respectively close the upper and lower parts of said slot, said last mentioned means acting to move one of the supplemental wing parts to a greater extent than the other part during the closing of the transverse slot whereby said wing parts are caused to assume diverging positions.

3. A wing structure for aeroplanes and the like comprising a main wing, a supplemental wing arranged in advance of the leading edge of the main wing and spaced apart therefrom to form a transverse slot between said wings, said supplemental wing being formed in two parts, means supporting the supplemental wing parts for swinging movement about an axis located forwardly of the leading edge of the main wing, and means for moving each of said supplemental wing parts so that they respectively close the upper and lower parts of said slot, said last mentioned means acting to move one of the supplemental wing parts to a greater extent than the other part during the closing of the transverse slot whereby said wing parts are caused to assume diverging positions, said wing parts being so arranged that, when the transverse slot is open, they lie in compactly interfitting relation.

In testimony whereof I have signed my name to this specification.

BERNARD THOMSON.